US011863533B2

(12) United States Patent
Schmid et al.

(10) Patent No.: US 11,863,533 B2
(45) Date of Patent: Jan. 2, 2024

(54) ARRANGEMENT AND METHOD FOR FUNCTIONALLY SAFE CONNECTION IDENTIFICATION

(71) Applicant: Siemens Aktiengesellschaft, Munich (DE)

(72) Inventors: Frank Schmid, Berg bei Neumarkt i. d. Opf. (DE); Herbert Barthel, Herzogenaurach (DE); Thomas Markus Meyer, Nuremberg (DE); Walter Maximilian, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 232 days.

(21) Appl. No.: 17/430,367

(22) PCT Filed: Mar. 10, 2020

(86) PCT No.: PCT/EP2020/056311
§ 371 (c)(1),
(2) Date: Aug. 12, 2021

(87) PCT Pub. No.: WO2020/193115
PCT Pub. Date: Oct. 1, 2020

(65) Prior Publication Data
US 2022/0158983 A1 May 19, 2022

(30) Foreign Application Priority Data
Mar. 28, 2019 (EP) .................................. 19165804

(51) Int. Cl.
*H04L 9/40* (2022.01)
(52) U.S. Cl.
CPC ........ *H04L 63/0414* (2013.01); *H04L 63/062* (2013.01)

(58) Field of Classification Search
CPC .......................... H04L 63/0414; H04L 63/062
See application file for complete search history.

(56) References Cited

U.S. PATENT DOCUMENTS

| 9,801,056 | B1 | 10/2017 | Parsel et al. |
| 10,922,113 | B2 | 2/2021 | Bartsch |
| (Continued) | | | |

FOREIGN PATENT DOCUMENTS

| CN | 1681242 | 10/2005 |
| CN | 102325131 | 1/2012 |
| (Continued) | | |

OTHER PUBLICATIONS

Pervez Farrukh et al: "Wireless Technologies for Emergency Response: A Comprehensive Review and Some Guidelines", IEEE Access, Bd. 6, Seiten 71814-71838, 2018.

(Continued)

*Primary Examiner* — Phy Anh T Vu
(74) *Attorney, Agent, or Firm* — Cozen O'Connor

(57) ABSTRACT

Apparatus and method for functionally securely transfer data in a two-sided data exchange of safety-related data between two communication partners (A, B), wherein a mapping is defined, which assigns to a consumer ID a provider ID of the same end point in the case of each bidirectional connection, and the mapping is made known to the two end points a priori, where the mapping could consist of the one's complement or alternatively of the two's complement, and wherein the connection between the data provider and the data consumer is established as described, the data consumer receives the address identification of the data provider via an additional side channel, for example, and after the connection has been established, the identification of the data provider can be securely checked.

18 Claims, 4 Drawing Sheets

(56) References Cited

U.S. PATENT DOCUMENTS

| | | | | |
|---|---|---|---|---|
| 2006/0242535 | A1* | 10/2006 | Barthel | H04L 1/0061 714/758 |
| 2007/0226322 | A1* | 9/2007 | Yamazaki | H04H 20/91 709/219 |
| 2014/0108665 | A1* | 4/2014 | Arora | H04L 67/563 709/227 |
| 2014/0372840 | A1* | 12/2014 | Barthel | H04L 1/0061 714/807 |
| 2015/0026785 | A1* | 1/2015 | Soon-Shiong | G06F 21/35 726/7 |
| 2017/0053293 | A1* | 2/2017 | Choi | G06Q 30/02 |
| 2018/0292796 | A1* | 10/2018 | Walter | G05B 19/048 |
| 2018/0294979 | A1 | 10/2018 | Ikarashi | |
| 2019/0312677 | A1* | 10/2019 | Hubert | H03M 13/096 |
| 2019/0357042 | A1* | 11/2019 | Hubert | H04W 12/06 |

FOREIGN PATENT DOCUMENTS

| | | |
|---|---|---|
| CN | 107637016 | 1/2018 |
| CN | 107682363 | 2/2018 |
| DE | 102014201954 | 8/2015 |
| EP | 3051779 | 8/2016 |

OTHER PUBLICATIONS

Simatic, Industrie Software S7 F/FH Systems—Projektieren und Programmieren, Ausgabe May 2009, A5E00048979-06; 2009.
"PROFIsafe Systembeschreibung, Technologie und Anwendung", Version Apr. 2016, Bestell-Nr. 4.341, Herausgeber Profibus Nutzerorganisation e.V. (PNO); 2016.
International PCT Search Report dated Jun. 24, 2020 based on PCT/EP2020/056311 filed Mar. 10, 2020.

* cited by examiner

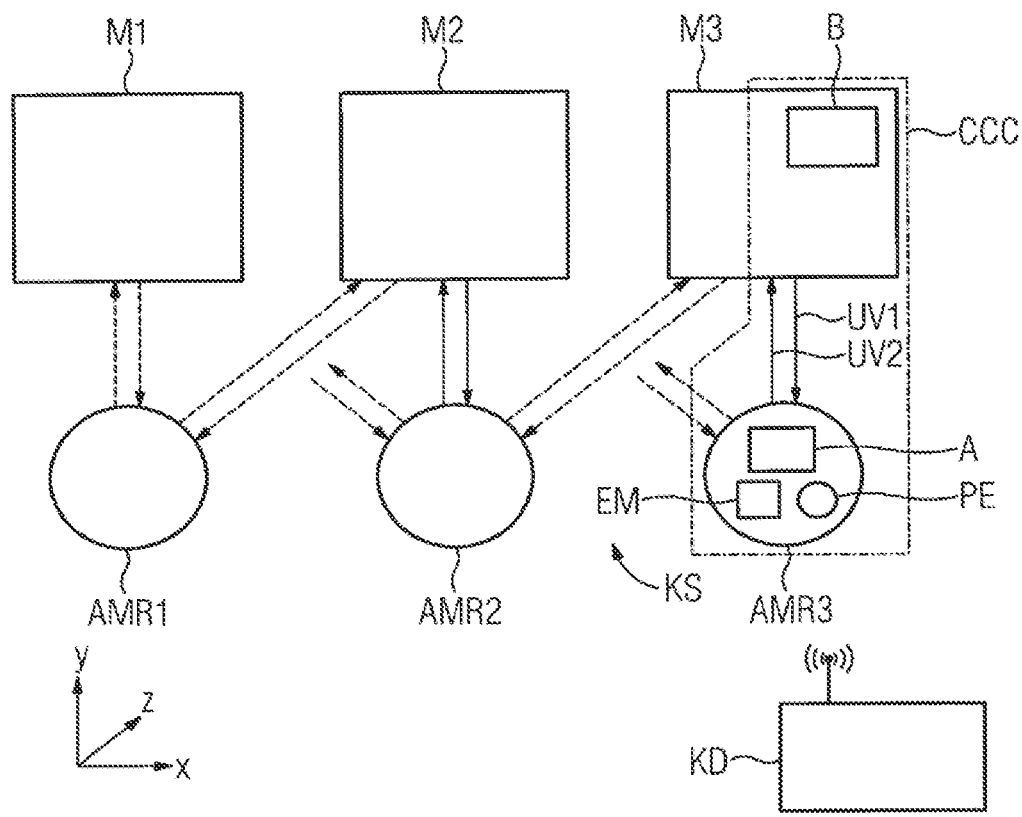
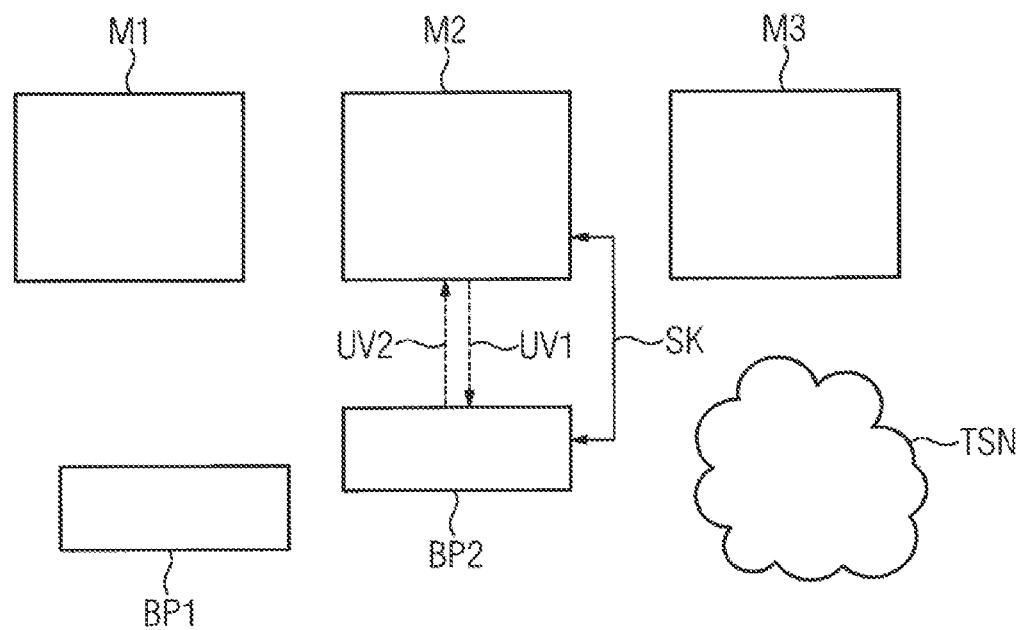

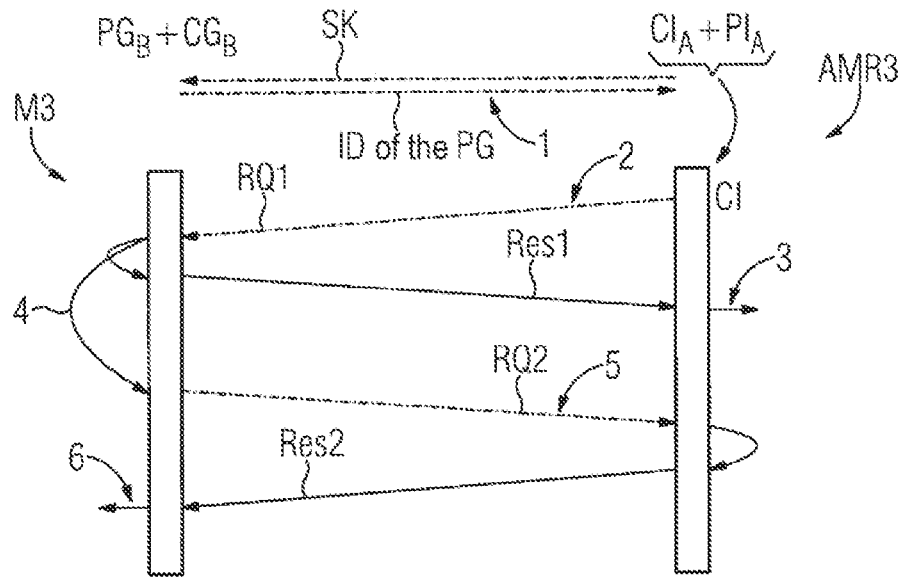
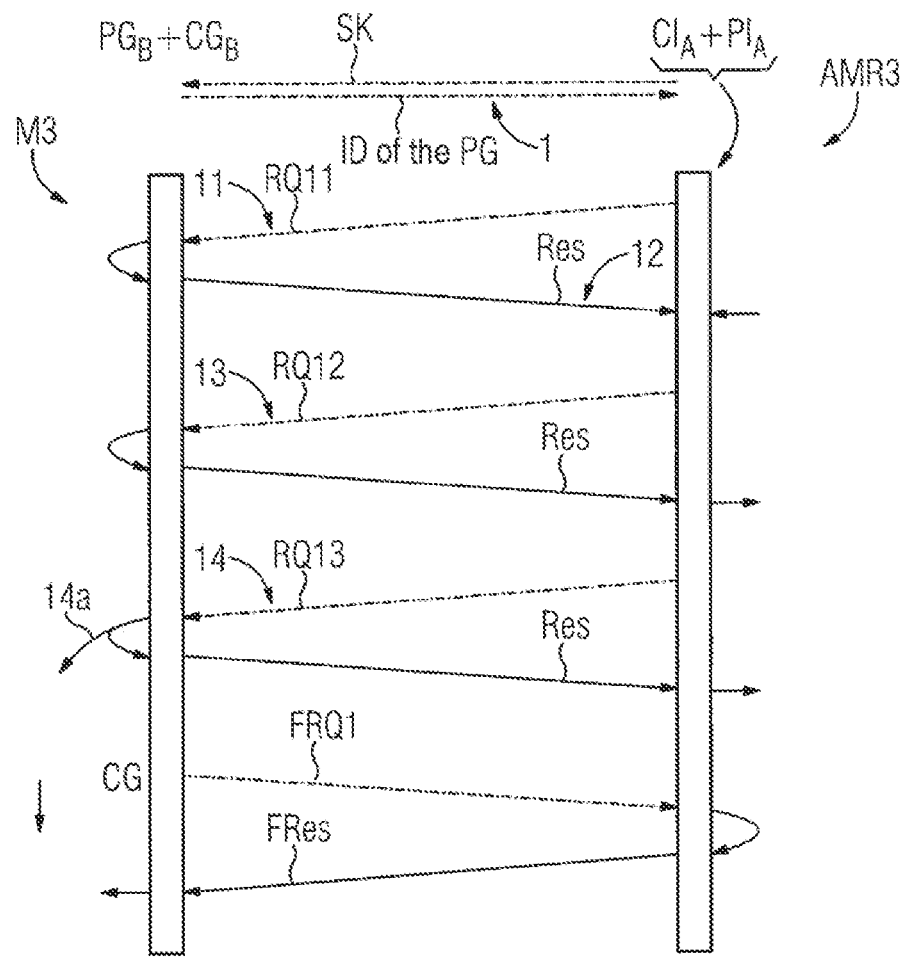

ARRANGEMENT AND METHOD FOR FUNCTIONALLY SAFE CONNECTION IDENTIFICATION

CROSS-REFERENCE TO RELATED APPLICATIONS

This is a U.S. national stage of application No. PCT/EP2020/056311 filed 10 Mar. 2020. Priority is claimed on European Application No. 19165804.6 filed 28 Mar. 2019, the content of which is incorporated herein by reference in its entirety.

BACKGROUND OF THE INVENTION

1. Field of the Invention

The invention relates to a method for functionally safe connection identification for a bilateral data interchange of safety-oriented data between two communication subscribers in a communication system, where safety-oriented data are interchanged via safety-oriented communication, address relationships comprising destination addresses and source addresses are firmly planned for the safety-oriented communication, a first data consumer having a first address identifier and a first data provider are additionally operated in a first communication subscriber, a second data provider having a third address identifier and additionally a second data consumer are operated in a second communication subscriber, a first unidirectional connection is set up between the first data consumer and the second data provider, while a second unidirectional connection is set up between the first data provider and the second data consumer.

In this context, a data consumer is understood to mean a communication device that requests data from another communication device, while a data provider is a communication device that provides data to other communication devices. By way of example, data in this case can be provided and distributed as stipulated by a client-server or publisher-subscriber concept.

2. Description of the Related Art

Functionally safe communication and connection identification are realized via PROFIsafe, for example.

The system description "PROFIsafe Systembeschreibung, Technologie und Anwendung", April 2016 version, order No 4.341, published by PROFIBUS Nutzerorganisation e.V. (PNO), describes the realization of safety-oriented communication and in particular safe connection identification for PROFIBUS and PROFINet protocols.

The manual "SIMATIC, Industrie Software S7 F/FH Systems—Projektieren und Programmieren", issue May 2009, A5E00048979-06, also describes safety-oriented communication, in particular for SIMATIC controllers.

A common feature of all of the cited and highlighted conventional methods for safety-oriented communication, in particular in automation engineering, is that the address relationship, comprising destination address and source address, is firmly planned, for example, by PROFIsafe subscribers on PROFIBUS or PROFINet.

An example that will be mentioned is the safety protocol PROFIsafe. In PROFIsafe, a 32-bit codename corresponding to an address relationship is used for unique connection identification.

For the functionally safe communication in PROFIsafe, for example, it is necessary to guarantee that a residual error probability per unit time is sufficiently low. Infringements of the data integrity (data integrity is checked by a signature, e.g., CRC), of an authenticity (authenticity is checked via a comparison with a source address and a destination address or with a codename) and of a timeline (timeline means: message data can be used only if they are received in the correct order and in good time) are considered.

In particular, in the case of communication in newer industrial installations, it is supposed to be possible for communication relationships to change frequently and quickly, i.e., a communication subscriber requires information from a specific other communication subscriber at one time and in turn from a different communication subscriber at another time. Examples in this regard are reconfigurable modular machines, driverless transport systems (AGVs), tool changers, tensioning frames, and/or crane trolleys.

In accordance with the highlighted prior art, a functionally safe communication connection needs to be firmly programmed and planned between all potential communication partners in each case. Given n subscribers, this is up to $n \cdot (n-1)$ connections, only a very small proportion of which are simultaneously active at any one time. However, a unique authenticity code (AA code in Profisafe: codename) needs to be allocated for each of these connections, where the authenticity code is used to safely recognize addressing errors (i.e., delivery of a communication message to an incorrect recipient).

These methods work only for unidirectional connections in the cited prior art, however; it is thus assumed that safety-oriented data flow only from a counterpart to an initiator, but not in the other direction.

SUMMARY OF THE INVENTION

It is therefore an object of the invention to provide a method-based solution and an arrangement that allow a data interchange with safety-oriented data to also be performed in a functionally safe manner for bidirectional connections.

This and other objects and advantages are achieved in accordance with the invention by a method in which the first communication subscriber ascertains the third address identifier, an identifier is produced in the first communication subscriber using a computation rule that is applied to a unique value, and this identifier is communicated to the first data consumer, the first data consumer transmits the unique value to the second data provider in a first request message, and the second data provider responds with a first response message containing first safety-oriented data and the third address identifier, where a check is performed in the first data consumer to determine whether the first response message contains the third address identifier and, if the result of this check is positive, then the first safety-oriented data are accepted, and otherwise rejected, as a result of which the first unidirectional connection is functionally protected, the computation rule is used to likewise produce the identifier in the second communication subscriber, and where the identifier is used to functionally protect the second unidirectional connection between the first data provider and the second data consumer.

In accordance with the invention, a map is defined that assigns a consumer ID of each bidirectional connection a provider ID of the same endpoint, and this map is made known to the two endpoints a priori. By way of example, this map could consist of the one's complement or alternatively of the two's complement. The connection between the data provider and the data consumer is set up in the above-described manner. The data consumer receives the address identifier from the data provider via an additional side channel, for example. After the connection setup, the identifier can be safely checked by the data provider.

The setup of the opposite direction between the further data provider and the further data consumer was not readily possible in accordance with the prior art, because the further data consumer does not know the identifier of the further data provider. The first unidirectional connection already existing in one direction cannot be used to interchange this identifier, because this would require precisely the other direction. In accordance with the invention, this now means that, for example, the identifier of the consumer always corresponds to the one's complement of the identifier of the provider. The identifier of the further consumer is communicated to the further data provider during connection setup, and this information can also be forwarded to a safety application. As a result, the identifier of the further data provider can be calculated in the counterpart at runtime, and can subsequently be used for setting up the connection between the further data consumer and the further data provider for functionally safe connection setup.

Advantageously, the method will therefore involve the second data consumer transmitting a second request message to the first data provider, the first data provider responding with a second response message containing second safety-oriented data and the identifier calculated using the computation rule, where a check is performed in the second data consumer to determine whether the second response message contains the identifier and, if the result of this check is positive, then the second safety-oriented data are accepted, and otherwise rejected.

For a practical code implementation, it is later advantageous if the first data provider is operated with a second address identifier and this second address identifier is used as the unique value. The check on the concomitantly delivered address identifiers of the respective data consumers ultimately checks whether the safety-oriented data come from a correct transmitter or, e.g., on account of a network error, come from an incorrect transmitter. In the general case, the data transmission is carried out in both directions, i.e., a functionally safe bidirectional data transmission takes place.

In particular, with respect to the use of new communication methods and new data structures, it is advantageous, based on the method, if the communication system used is a system based on Open Platform Communication (OPC) Unified Architecture (UA) client/server mechanisms with Transmission Control Protocol/Internet Protocol (TCP/IP) communication or a system based on OPC UA Pub/Sub mechanisms with TCP/IP communication to which the mechanisms for a time-sensitive network have been added.

The method described in accordance with the invention can be employed particularly advantageously for a safety communication using an OPC UA communication system. This is because a bidirectional, preferably functionally safe, connection for OPC UA communication consists specifically internally of two unidirectional, functionally safe connections. Each unidirectional connection is set up between a provider (data provider) and a consumer (data consumer). All in all, there are accordingly thus two providers and two consumers, called PI, CG, PG, CI for "provider initiator", "consumer counterpart", "provider counterpart" and "consumer initiator".

Although the protocol safety mechanisms that are tried and tested in accordance with the prior art (e.g., CRC check, code names, monitoring number, watchdog monitoring and SIL monitor (safe delimitation of recognized errors)) can be adopted, they are no longer adequate for the future. Against the background of Industry 4.0, support for flexible installation structures with changing communication partners is additionally of critical importance. Any desired network topology can be supported with a safety protocol for OPC UA, connections also being able to be set up and cleared down at runtime in principle. A given interface can be used alternately by different partners. This benefits, e.g., modular machines such as autonomous guided vehicles (AGVs) or autonomous mobile robots (AMRs) and/or tool changers.

Unlike in the case of functionally safe communication protocols today, it is no longer necessary for all subscribers to be made known to one another as early as during the planning. This allows the installation to have, e.g., a new mobile robot added without having to re-parameterize all the fixed machines. OPC UA has been used to introduce an object-oriented information model, and the functionally safe connection identification according to the invention now allows OPC UA to be used to perform a safe controller-controller communication.

Advantageously, the first communication subscriber is therefore operated by or in an autonomous robot unit and the second communication subscriber is therefore operated by or in a machine, where the communication is set up after the robot unit approaches the machine. This method is advantageously employed when a set of autonomous mobile robots in a factory building need to travel to different machines. Only one robot at a time can be at a machine. When a robot is at a machine, a functionally safe connection between the machine and the robot is set up, e.g., via a wireless network. Before data are interchanged, however, it is necessary to check whether the robot is communicating with the correct machine and not, e.g., with an adjacent machine.

If a maximum numerical value of the second address identifier exceeds a word length available in a protocol that is used, the first data consumer will split the second address identifier into parts and transmit the parts to the second data provider using partial request messages, and the second data provider assembles the parts and ascertains the second address identifier therefrom, where after the second address identifier is definite the second data consumer transmits a final request message and the final request message is in turn answered with the second response message containing the second safety-oriented data and the second address identifier.

It may happen that a provider ID is longer than a consumer ID. Unique calculation of the provider ID from the consumer ID is then no longer possible. Therefore, it is also proposed here that the space for the "monitoring number" used for the request sent by the consumer be used to transmit the additional bits of the ID. According to the specification, the current values of the "monitoring number" can be chosen freely by the consumer. This can be used to signal to the counterpart that the ID of the PI is being transmitted, e.g., by virtue of the "monitoring number" being set to zero. The ID can then be transmitted in the monitoring number of the messages that follow, or in the "consumer ID" field.

In an arrangement having a first communication subscriber and a second communication subscriber that interchange data via a communication system, where the first communication subscriber has a first data consumer having a first address identifier and a first data provider having a second address identifier, the second communication subscriber has a second data provider having a third address identifier and a second data consumer, where means are present in order to set up a first unidirectional connection between the first data consumer and the second data provider and a second unidirectional connection between the first data provider and the second data consumer, a solution as follows is provided.

The first communication subscriber is configured to ascertain the third address identifier. The first communication subscriber additionally has a mapping unit configured to use a computation rule, which is applied to a unique value, to produce an identifier. The mapping unit is additionally configured to forward the identifier to the first data consumer, the first data consumer is configured to transmit the unique value to the second data provider in a first request message, the second data provider is configured to respond to the first request message with a first response message containing first safety-oriented data and the third address identifier, where safety-oriented data are interchanged via safety-oriented communication and address relationships comprising destination addresses and source addresses are firmly planned for the safety-oriented communication. The first data consumer additionally has checking means configured to check whether the first response message contains the third address identifier, and additionally the checking means is configured so as, if the result of this check is positive, to declare the first safety-oriented data to be valid, and otherwise to reject them, as a result of which the first unidirectional connection is functionally protected. The second communication subscriber has a reverse mapping unit configured to use the computation rule to recover the identifier from the unique value and to transfer the identifier to the second data consumer, and the first data provider and the second data provider are configured to use the identifier that is now known to them on both sides to functionally protect the second unidirectional connection between the first data provider and the second data consumer. Both communication subscribers know the computation rule. Accordingly, the communication subscribers can calculate the identifier for the functional safety check independently of one another.

The arrangement additionally provides for the second data consumer to be configured to transmit a second request message to the first data provider, for the first data provider to be configured to respond with a second response message containing second safety-oriented data and the identifier, where the second data consumer has cross-checking means configured to check whether the second response message contains the identifier and, if the result of this check is positive, then the second safety-oriented data are accepted, and otherwise rejected.

In particular, with regard to the digitization and realization of Industry 4.0 within process automation, it is advantageous if the communication system is configured as a system that has controller-controller communication, based on OPC UA client/server mechanisms with TCP/IP communication, or if a system is used that is based on OPC UA Pub/Sub mechanisms with TCP/IP communication to which the mechanisms for a time-sensitive network have been added.

To ascertain the third address identifier, it is advantageously possible either to use a side channel that is independent of the communication system and that is configured to provide the third address identifier for the first data consumer, or, in an alternative configuration, there is provision for the arrangement to have an ascertaining means configured to access a configuration database, and additionally the first communication subscriber comprises position ascertaining means configured to ascertain the position data of the first communication subscriber, where the ascertaining means is configured to take the position data as a basis for using the configuration database to ascertain the third address identifier.

Advantageously, the arrangement is used for autonomous mobile robot units, an autonomous mobile robot unit then having the first communication subscriber and a machine then having the second communication subscriber, where the robot unit is configured to approach the machine and to set up a communication.

In summary, that the disclosed embodiments of the invention relate to a method and an arrangement that allow functionally safe connection identification to be realized and that no longer require a monitoring mechanism to be performed at the data provider for the communication relationships. The disclosed embodiments of the method and arrangement for functionally safe connection identification provide "relationship-flexible functionally safe communication with a unilateral check for a bilateral data interchange".

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows multiple exemplary embodiments of the invention, in which:

FIG. 1 shows a machine/robot system in accordance with the invention, where the robots set up functionally safe bidirectional connections to the machines;

FIG. 2 shows a machine/control panel system in accordance with the invention, where the control panels can set up a functionally safe bidirectional connection to the machines;

FIG. 4 shows a timing sequence for request messages between a first and a second communication partner in accordance with a first embodiment;

FIG. 5 shows a timing sequence for request messages between a first and a second communication subscriber in in accordance with a second variant embodiment;

DETAILED DESCRIPTION OF THE EXEMPLARY EMBODIMENTS

FIG. 1 shows a first machine M1, a second machine M2 and a third machine M3, which can set up functionally safe connections to a first autonomous mobile robot unit AMR1, a second autonomous mobile robot unit AMR2 and a third autonomous mobile robot unit AMR3. Here, functionally safe means in particular that the recipient can check whether the received data come from the correct transmitter, and have not been received from a different transmitter, e.g., on account of a network error or mobile radio interference. In the general case, the data transmission is performed in both directions, i.e., a bidirectional data transmission occurs here. The autonomous mobile robot units AMR1, AMR2, AMR3 are in a factory building with an extent that can be described by way of a coordinate system XYZ. According to FIG. 1, the communication system KS used is, such as a radio standard with a superimposed PROFIsafe protocol. It would also be possible to use a PROFINet standard, in which communication occurs via Ethernet, but this would require the robots to mechanically dock on the machines.

The third autonomous mobile robot AMR3 has the first communication subscriber A and the third machine M3 has the second communication subscriber B. The two communication subscribers A, B form an arrangement CCC, which is described in more detail with reference to FIG. 3.

When the third autonomous mobile robot AMR3 approaches the machine M3, it sets up a connection to the second communication subscriber B via the first communication subscriber A, and it therefore makes a first unidirectional connection UV1 and a second unidirectional connection UV2. The third autonomous mobile robot AMR3 additionally has a position ascertaining means PE that it can use to ascertain its position data X, Y, Z. Additionally, the third autonomous mobile robot AMR3 has an ascertaining means EM configured to access a configuration database KD, the ascertaining means additionally being designed to take the position data X, Y, Z as a basis for using the configuration database KD to ascertain the third address identifier ID_PG$_B$.

FIG. 2 shows another exemplary embodiment of functionally safe connection setup between mobile devices and machines. The first machine M1, the second machine M2 and the third machine M3 can be operated using different control panels BP1, BP2. Here, a second control panel PB2 has registered with the second machine M2 and uses a side channel SK to set up a first safe unidirectional connection UV1 and a second safe unidirectional connection UV2. The communication system KS used is a time-sensitive network TSN.

Figure 3:
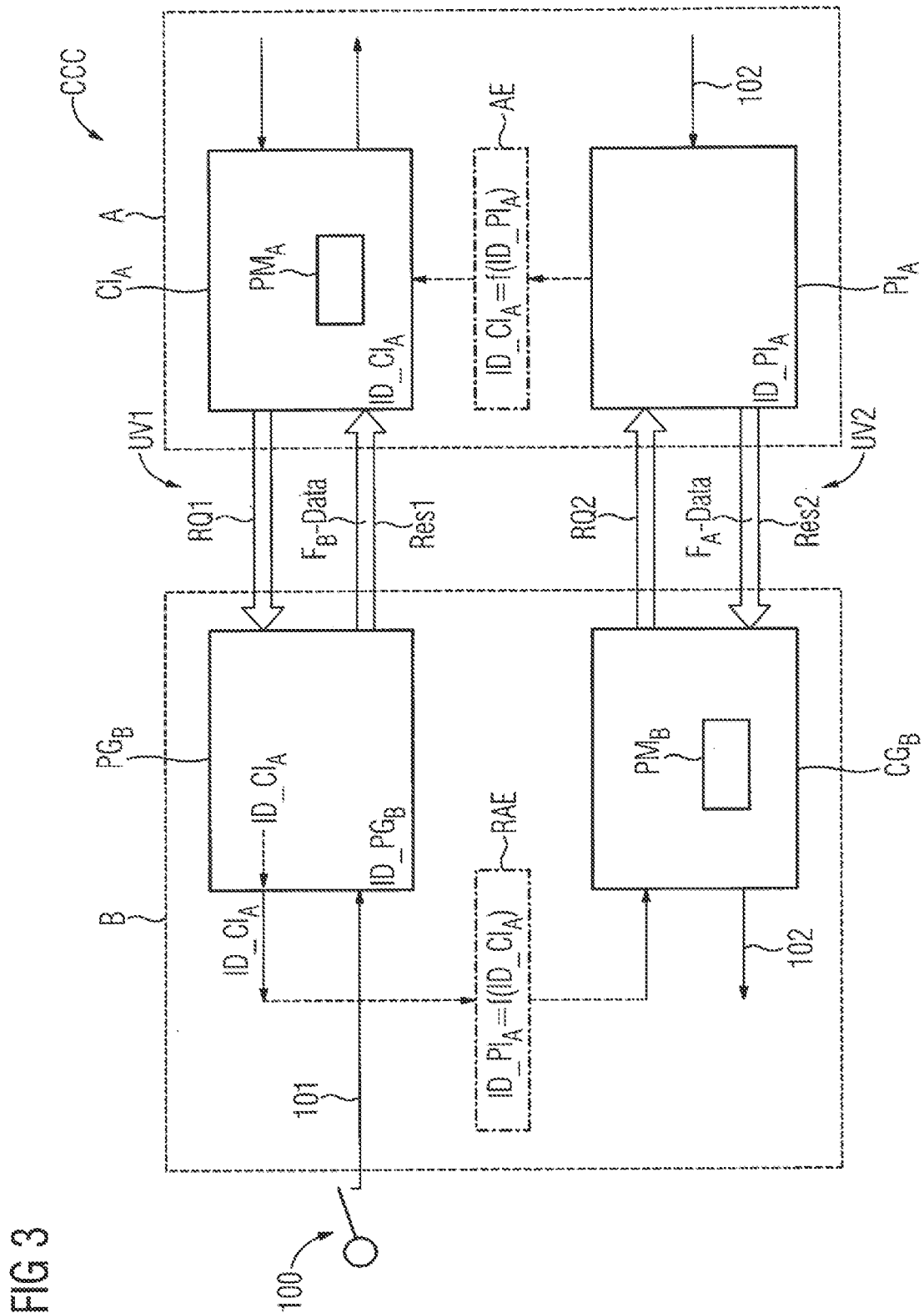
FIG. 3 shows an arrangement configured as a controller-controller communication device in accordance with the invention.

FIG. 3 shows an arrangement CCC for controller-controller communication. A first communication subscriber A sets up two unidirectional functionally safe connections UV1, UV2 to a second communication subscriber B. The first communication subscriber A has a first data consumer CI$_A$ having a first address identifier ID_CI$_A$ and a first data provider PI$_A$ having a second address identifier ID_PI$_A$. The second communication subscriber B has a second data provider PG$_B$ having a third address identifier ID_PG$_B$ and a second data consumer CG$_B$.

Additionally, means are present for setting up a first unidirectional functionally safe connection UV1 between the first data consumer CI$_A$ and the second data provider PG$_B$ and a second unidirectional functionally safe connection UV2 between the first data provider PI$_A$ and the second data consumer CG$_B$.

The first communication subscriber A is configured to ascertain the third address identifier ID_PG$_B$ of the second data provider PG$_B$. The first communication subscriber A has a mapping unit AE configured to use a computation rule f, which is applied to the second address identifier ID_PI$_A$, to produce the first address identifier ID_CI$_A$. Additionally, the mapping unit AE is configured to forward the second address identifier ID_PI$_A$ to the first data consumer CI$_A$. The first data consumer CI$_A$ is configured to transmit the second address identifier ID_PI$_A$ to the second data provider PG$_B$ in a first request message RQ1. The second data provider PG$_B$ is configured to respond to the first request message RQ1 with a first response message Res1. The first response message Res1 contains first safety-oriented data F$_B$-Data and the third address identifier ID_PG$_B$. The first data consumer CI$_A$ has checking means PM$_A$. These checking means PM$_A$ are configured to check whether the first response message Res1 contains the third address identifier ID_PG$_B$. This check can be performed by the checking means PM$_A$ because the first communication subscriber A has retrieved the third address identifier ID_PG$_B$ via a side channel SK in an earlier step. Additionally, the checking means PM$_A$ is configured so as, if the result of this check is positive, to declare the first safety-oriented data F$_B$-Data to be valid, and otherwise to reject them, as a result of which the first unidirectional connection UV1 is functionally protected.

The second communication subscriber B has a reverse mapping unit RAE configured to use the computation rule f to recover the second address identifier ID_PI$_A$ from the first address identifier ID_CI$_A$ and to transfer the second address identifier to the second data consumer CG$_B$ for a later request.

The first data provider PI$_A$ and the second data consumer CG$_B$ are now configured to use the second address identifier ID_PI$_A$ that is now known to them on both sides to functionally protect the second unidirectional connection UV2 between the first data provider PI$_A$ and the second data consumer CG$_B$. To this end, the second data consumer CG$_B$ essentially has a cross-checking means PM$_B$ configured to check whether the second response message Rest contains the second address identifier ID_PI$_A$ and, if the result of this check is positive, then the second safety-oriented data F$_A$-Data are accepted, and otherwise rejected.

As safety-oriented data, it would be possible, for example, for the data signal of an emergency off switch 100 to be passed on. An emergency stop command 101 is forwarded to the first communication subscriber A via the first unidirectional connection UV1 as a functionally safe datum F$_B$-Data. Safety-oriented data could also be a ready signal 102 from a robot. These would then be forwarded from the first communication subscriber A to the second communication subscriber B via the second unidirectional connection UV2.

FIG. 4 shows a timing sequence for request messages RQ1 and response messages Res1. The right-hand side depicts the first communication subscriber A in the form of an autonomous mobile robot unit AMR3, in principle. The first communication subscriber A has the first data consumer CI$_A$ and the first data provider PI$_A$. The method for functionally safe connection identification involves the first communication subscriber A ascertaining the third address identifier ID_PG$_B$, for example, via a side channel SK, in a first step 1. The third address identifier ID_PG$_B$ is now known to the first communication subscriber A. In a second step 2, the computation rule f is used in the first communication subscriber A to calculate the first address identifier ID_CI$_A$, and this first address identifier ID_CI$_A$ is transmitted to the second data provider PG$_B$ in a first request message RQ1. The second data provider PG$_B$ responds with a first response message Res1 containing first safety-oriented data F$_B$-Data and the third address identifier ID_PG$_B$. In a third step 3, a check is performed in the first communication subscriber A or in the first data consumer CI$_A$ to determine whether the first response message Res1 contains the third address identifier ID_PG$_B$, and, if the result of this check is positive, then the first safety-oriented data F$_B$-Data are accepted, and otherwise rejected.

In a fourth step 4, the computation rule f is used to likewise produce the second address identifier ID_PI$_A$ in the second communication subscriber B and to forward the second address identifier to the second data consumer CG$_B$. The second data consumer now sends a second request message RQ2 to the first data provider $PI_A$ in a fifth step 5. The first data provider $PI_A$ responds with a second response message Res2 containing second safety-oriented data $F_A$-Data and the second address identifier $ID\_PI_A$.

In a sixth step 6, a check is then performed to determine whether the second response message Res2 contains the second address identifier $ID\_PI_A$, and, if the result of this check is positive, then the second safety-oriented data $F_A$-Data are accepted, and otherwise rejected.

FIG. 5 depicts an alternative timing sequence for request and response messages. This method would be employed if a maximum value of the second address identifier $ID\_PI_A$ exceeds a word length available in a protocol that is used. The first data consumer $CI_A$ would then split the second address identifier $ID\_PI_A$ into parts part1, part2, part3 and transmit the parts part1, part2, part3 to the second data provider $PG_B$ using partial request messages RQ11, RQ12, RQ13. The parts part1, part2, part3 are reassembled in the second data provider $PG_B$ and the second address identifier $ID\_PI_A$ is ascertained.

Accordingly, the address identifier $ID\_PG_B$ is again ascertained via a side channel SK in a step 1. In an alternative first step 11, a first partial request message RQ11 is used to transmit the first part part1. In an alternative second step 12, this transmission is answered with a response message Res. In an alternative third step 13, a second partial request message RQ12 is used to transmit the second part part2. In an alternative fourth step 14, a third partial request message RQ13 is used to transmit the third part part3. In an alternative fourth intermediate step 14a, the address identifier is now assembled from the three parts part1, part2, part3, and the computation rule f is applied to the assembled parts part1, part2, part3. A final request message FRQ1 is now transmitted, which is answered with a final response message FRES. This final response message FRES contains the safety-oriented data $F_A$-Data and the second address identifier $ID\_PI_A$. Although the second address identifier $ID\_PI_A$ is now an address with a long word length, the special feature of the protocol employed is that there is provision for more space in the response messages than in the request messages.

Figure 6:
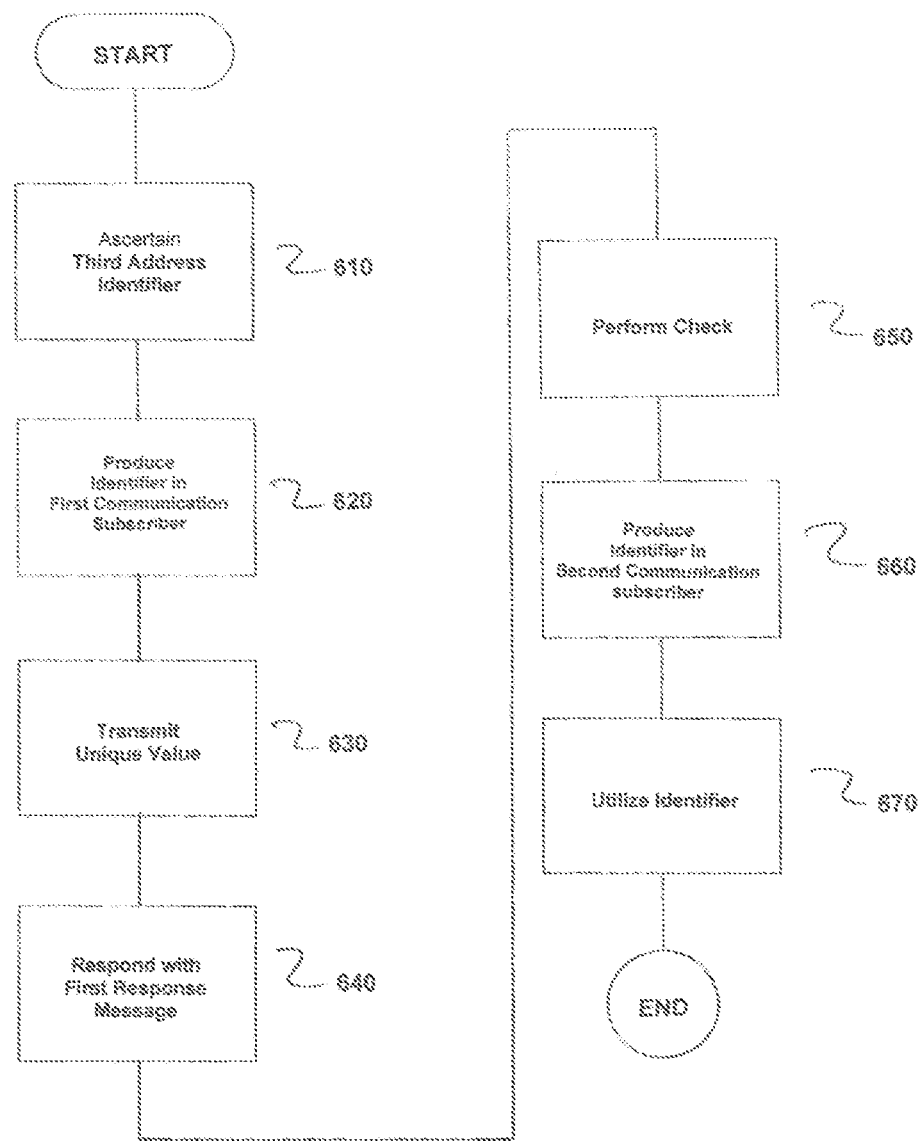
FIG. 6 is a flowchart of the method in accordance with the invention.

FIG. 6 is a flowchart of the method for functionally safe connection identification for a bilateral data interchange of safety-oriented data $F_B$ data, FA data between two communication subscribers A, B in a communication system KS, where safety oriented data is interchanged via safety-oriented communication, address relationships comprising destination addresses and source addresses are planned for the safety-oriented communication, a first data consumer $CI_A$ having a first address identifier $ID\_CI_A$ and a first data provider PIA are operated in a first communication subscriber A, a second data provider PGB having a third address identifier ID_PGB is operated, a second data consumer $CG_B$ is additionally operated, in a second communication subscriber B, a first unidirectional connection UV1 is set up between the first data consumer $CI_A$ and the second data provider PGB, and a second unidirectional connection UV2 is set up between the first data provider PIA and the second data consumer $CG_B$. The method comprises ascertaining, by the first communication subscriber A, the third address identifier ID_PGB, as indicated in step 610.

Next, an identifier is produced in the first communication subscriber A utilizing a computation rule f that is applied to a unique value, as indicated in step 620. Here, the identifier is communicated to the first data consumer $CI_A$.

Next, the first data consumer $CI_A$ transmits the unique value to the second data provider PGB in a first request message RQ1, as indicated in step 630.

Next, the second data provider PGB responds with a first response message Res1) containing first safety-oriented data $F_B$-Data and the third address identifier ID_PGB, as indicated in step 640.

Next, a check is performed in the first data consumer $CI_A$ to determine whether the first response message Res1 contains the third address identifier ID_PGB, and the first safety-oriented data $F_B$-Data is accepted if a result of the check is positive, and otherwise rejecting the first safety-oriented data $F_B$-Data if the result of the check is negative, as indicated in step 650.

Next, the identifier is produced in the second communication subscriber B utilizing the computation rule f, as indicated in step 660.

Next, the identifier is utilized to functionally protect the second unidirectional connection UV2 between the first data provider PIA and the second data consumer $CG_B$, as indicated in step 670.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for functionally safe connection identification for a bilateral data interchange of safety-oriented data between two communication subscribers in a communication system, the safety-oriented data being interchanged via safety-oriented communication, address relationships comprising destination addresses and source addresses, the destination addresses and the source addresses being planned for the safety-oriented communication, a first data consumer having a first address identifier and a first data provider being operated in a first communication subscriber, a second data provider having a third address identifier being operated, a second data consumer being additionally operated, in a second communication subscriber, a first unidirectional connection being set up between the first data consumer and the second data provider, and a second unidirectional connection being set up between the first data provider and the second data consumer, the method comprising:
ascertaining, by the first communication subscriber, the third address identifier;
producing an identifier in the first communication subscriber utilizing a computation rule which is applied to a unique value, said identifier being communicated to the first data consumer;
transmitting, by the first data consumer, the unique value to the second data provider in a first request message;

responding, by the second data provider, with a first response message containing first safety-oriented data and the third address identifier;

performing a check in the first data consumer to determine whether the first response message contains the third address identifier, and, accepting the first safety-oriented data if a result of said check is positive, and otherwise rejecting the first safety-oriented data if the result of said check is negative;

producing the identifier in the second communication subscriber utilizing the computation rule; and utilizing the identifier to functionally protect the second unidirectional connection between the first data provider and the second data consumer.

2. The method as claimed in claim 1, wherein the second data consumer transmits a second request message to the first data provider, the first data provider responds with a second response message containing second safety-oriented data and the identifier; and wherein a check is performed in the second data consumer to determine whether the second response message contains the identifier, and the second safety-oriented data are accepted if the result of this check is positive, and the second safety-oriented data are otherwise rejected if the result of this check is negative.

3. The method as claimed in claim 2, wherein the first data provider is operated with a second address identifier and said second address identifier is utilized as the unique value.

4. The method as claimed in claim 3, wherein the communication system utilized comprises one of (i) a system based on Open Platform Communication (OPC) Unified Architecture (UA) client/server mechanisms with Transmission Control Protocol/Internet Protocol (TCP/IP) communication and (ii) a system based on OPC UA Pub/Sub mechanisms with TCP/IP communication to which the mechanisms for a time-sensitive network (TSN) have been added.

5. The method as claimed in claim 3, wherein if a maximum numerical value of the second address identifier exceeds a word length available in a protocol that is used, then the first data consumer splits the second address identifier into parts and transmits the parts to the second data provider utilizing partial request messages, and said second data provider assembles the parts and ascertains the second address identifier; and wherein after the second address identifier is definite, the second data consumer transmits a final request message and said final request message is in turn answered with the second response message containing the second safety-oriented data and the second address identifier.

6. The method as claimed in claim 2, wherein the communication system utilized comprises one of (i) a system based on Open Platform Communication (OPC) Unified Architecture (UA) client/server mechanisms with Transmission Control Protocol/Internet Protocol (TCP/IP) communication and (ii) a system based on OPC UA Pub/Sub mechanisms with TCP/IP communication to which the mechanisms for a time-sensitive network (TSN) have been added.

7. The method as claimed in claim 1, wherein the communication system utilized comprises one of (i) a system based on Open Platform Communication (OPC) Unified Architecture (UA) client/server mechanisms with Transmission Control Protocol/Internet Protocol (TCP/IP) communication and (ii) a system based on OPC UA Pub/Sub mechanisms with TCP/IP communication to which the mechanisms for a time-sensitive network (TSN) have been added.

8. The method as claimed in claim 1, wherein the third address identifier is ascertained via a side channel which is independent of the communication system or based on a configuration database utilizing position data of the first communication subscriber.

9. The method as claimed in claim 1, wherein the first communication subscriber is operated by or in an autonomous robot unit and the second communication subscriber is operated by or in a machine; and wherein communication is set up after the robot unit approaches the machine.

10. An arrangement comprising:

a first communication subscriber and a second communication subscriber which interchange data via a communication system, the first communication subscriber including a first data consumer having a first address identifier and a first data provider having a second address identifier, the second communication subscriber including a second data provider having a third address identifier and a second data consumer;

circuitries which set up a first unidirectional connection between the first data consumer and the second data provider and a second unidirectional connection between the first data provider and the second data consumer;

wherein the first communication subscriber ascertains the third address identifier;

wherein the first communication subscriber includes one or more circuitries, the one or more circuitries applies a computation rule to a unique value, to produce an identifier;

subsequently, the one or more circuitries forwards the identifier to the first data consumer;

transmits, by the first data consumer, the unique value to the second data provider in a first request message;

responds, by the second data provider, a first response message to the first request message, the first response message containing first safety-oriented data and the third address identifier, the first safety-oriented data being interchanged via (i) safety-oriented communication and (ii) address relationships comprising destination addresses and source addresses, and the destination addresses and source addresses being affirmatively are firmly planned for the safety-oriented communication;

wherein the one or more circuitries further determines whether the first response message contains the third address identifier, in response to a positive determination, the first safety-oriented data is declared to be valid, otherwise rejecting the first safety-oriented data in response to a negative determination;

wherein the second communication subscriber includes circuitry, the circuitry utilizes the computation rule to recover the identifier from the unique value and transfers said identifier to the second data consumer; and wherein the first data provider and the second data consumer utilize the identifier which is currently known to the first data provider and the second data consumer on both sides to functionally protect the second unidirectional connection between the first data provider and the second data consumer.

11. The arrangement as claimed in claim 10, wherein the second data consumer transmits a second request message to the first data provider;

wherein the first data provider responds with a second response message containing second safety-oriented data and the identifier; and wherein the second data consumer includes circuitry, the circuitry determines whether the second response message contains the identifier, and accepts the second safety-oriented data if a result a positive determination, and otherwise rejects the second safety-oriented data if the result is negative.

12. The arrangement as claimed in claim 11, wherein the communication system comprises one of (i) a system configured as a controller-controller communication system based on Open Platform Communication (OPC) Unified Architecture (UA) client/server mechanisms with Transmission Control Protocol/Internet Protocol (TCP/IP) communication and (ii) a system based on OPC UA Pub/Sub mechanisms with TCP/IP communication to which the mechanisms for a time-sensitive network (TSN) have been added.

13. The arrangement as claimed in claim 11, wherein the arrangement includes a side channel which is independent of the communication system and which is configured to provide the third address identifier for the first data consumer.

14. The arrangement as claimed in claim 10, wherein the communication system comprises one of (i) a system configured as a controller-controller communication system based on Open Platform Communication (OPC) Unified Architecture (UA) client/server mechanisms with Transmission Control Protocol/Internet Protocol (TCP/IP) communication and (ii) a system based on OPC UA Pub/Sub mechanisms with TCP/IP communication to which the mechanisms for a time-sensitive network (TSN) have been added.

15. The arrangement as claimed in claim 14, wherein the arrangement includes a side channel which is independent of the communication system and which is configured to provide the third address identifier for the first data consumer.

16. The arrangement as claimed in claim 14, further comprising:
- the one or more circuitries of the first communication subscriber accesses a configuration database;
- the one or more circuitries of the first communication subscriber further ascertains position data of the first communication subscriber, and uses the position data as a basis for utilizing the configuration database to ascertain the third address identifier.

17. The arrangement as claimed in claim 10, wherein the arrangement includes a side channel which is independent of the communication system and which is configured to provide the third address identifier for the first data consumer.

18. The arrangement as claimed in claim 10, wherein an autonomous mobile robot includes the first communication subscriber and a machine includes the second communication subscriber; and wherein the robot approaches the machine and sets up a communication.

* * * * *